United States Patent
Takahashi et al.

(10) Patent No.: US 11,667,745 B2
(45) Date of Patent: Jun. 6, 2023

(54) METHOD FOR PRODUCING OXYMETHYLENE COPOLYMER

(71) Applicant: MITSUBISHI GAS CHEMICAL COMPANY, INC., Tokyo (JP)

(72) Inventors: Toru Takahashi, Tokyo (JP); Daigo Nakaya, Tokyo (JP); Kensuke Oshima, Tokyo (JP); Daisuke Sunaga, Yokkaichi (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 1042 days.

(21) Appl. No.: 16/347,072

(22) PCT Filed: Nov. 6, 2017

(86) PCT No.: PCT/JP2017/039926
§ 371 (c)(1),
(2) Date: May 2, 2019

(87) PCT Pub. No.: WO2018/084281
PCT Pub. Date: May 11, 2018

(65) Prior Publication Data
US 2020/0055974 A1 Feb. 20, 2020

(30) Foreign Application Priority Data
Nov. 7, 2016 (JP) .............................. JP2016-216918

(51) Int. Cl.
*C08G 2/24* (2006.01)

(52) U.S. Cl.
CPC ...................... *C08G 2/24* (2013.01)

(58) Field of Classification Search
CPC ............... C08G 2/24; C08G 2/10; C08G 4/00
See application file for complete search history.

(56) References Cited

U.S. PATENT DOCUMENTS

| | | |
|---|---|---|
| 4,431,794 A | 2/1984 | Sadlowski et al. |
| 5,608,030 A | 4/1997 | Hoffmockel et al. |
| 2009/0270572 A1 | 10/2009 | Haubs et al. |
| 2013/0018170 A1 | 1/2013 | Hoffmockel et al. |
| 2016/0369050 A1* | 12/2016 | Nakaya .................... C08G 2/06 |

FOREIGN PATENT DOCUMENTS

| | | |
|---|---|---|
| EP | 3 239 201 | 11/2017 |
| JP | 58-98322 | 6/1983 |
| JP | 7-90037 | 4/1995 |
| JP | 8-325341 | 12/1996 |
| JP | 9-302055 | 11/1997 |
| JP | 2009-221418 | 10/2009 |
| JP | 2010-504380 | 2/2010 |
| JP | 2011-516702 | 5/2011 |
| JP | 2013-28804 | 2/2013 |
| WO | 2008/034571 | 3/2008 |
| WO | 2015/002147 | 1/2015 |
| WO | 2016/104065 | 6/2016 |

OTHER PUBLICATIONS

Official Communication issued in International Application No. PCT/JP2017/039926, dated Dec. 19, 2017 and English language version thereof.

* cited by examiner

*Primary Examiner* — Shane Fang
(74) *Attorney, Agent, or Firm* — Greenblum & Bernstein, P.L.C.

(57) ABSTRACT

The present invention addresses the problem of providing a method for producing an oxymethylene copolymer, which is capable of producing an oxymethylene copolymer having a high molecular weight with high yield and high economic efficiency. This problem is able to be solved by a method for producing an oxymethylene copolymer, in which a copolymer starting material containing a trioxane and a comonomer is subjected to a polymerization reaction in the presence of a polymerization initiator that contains an acidic compound (A), and wherein: the copolymer starting material contains a basic compound (B); an acidic compound (C) that is different from the acidic compound (A) is added into the copolymer starting material before performing the polymerization reaction, thereby causing a reaction between the basic compound (B) and the acidic compound (C) in advance; and the polymerization reaction is carried out by means of melt polymerization.

16 Claims, No Drawings

METHOD FOR PRODUCING OXYMETHYLENE COPOLYMER

TECHNICAL FIELD

The present invention relates to a method for producing an oxymethylene copolymer.

BACKGROUND ART

Oxymethylene polymers are excellent in mechanical and thermal properties, where oxymethylene copolymers in particular have better thermal stability and formability than oxymethylene homopolymers. Thus, they have been considered useful as engineering plastics. Many documents describe methods for producing an oxymethylene copolymer. For example, Patent document 1 describes a method for producing an oxymethylene copolymer (bulk polymerization method) in which 1,3,5-trioxane (hereinafter, simply referred to as trioxane) and a comonomer are allowed to polymerize in the presence of a polymerization initiator at a temperature of 60-115° C., and the copolymer produced by the polymerization reaction is crystallized and precipitated.

Patent document 2 discloses a continuous method for bulk polymerization of trioxane in which trioxane and a comonomer are subjected to bulk polymerization in the presence of a polymerization initiator at a temperature of 135-300° C., during which the starting monomers and the resulting copolymer are present in a molten state.

Patent document 3 discloses a method for continuously producing an oxymethylene copolymer with stable terminal groups in a homogeneous phase, comprising the steps of: allowing polymerization reaction in the presence of protonic acid as a polymerization initiator for a specific period of time in a tubular reactor having static stirring elements; immediately deactivating the polymerization initiator; stabilizing the unstable terminal groups (hemiacetal terminal groups) in the presence of residual monomers; and removing volatile components from the reaction mixture by evaporation.

Patent document 4 discloses heterogeneous polymerization reaction using a cationic polymerization initiator containing a protonic acid and a protonic acid salt. Patent document 5 discloses a method for producing a highly stable oxymethylene copolymer by directly supplying an oxymethylene copolymer containing residual monomers in a homogeneous molten state to a high temperature hydrolysis mixture containing a protic solvent, and subsequently precipitating the oxymethylene copolymer.

Meanwhile, the present inventors disclose that a polyoxymethylene copolymer having a high molecular weight can be produced at high yield by a method for producing an oxymethylene copolymer while maintaining a molten state from the beginning to the end of the polymerization reaction, which has conventionally been difficult to produce a high molecular weight polymer, the method comprising cationically polymerizing trioxane and a comonomer at a polymerization temperature of 135-300° C. in the presence of at least one polymerization initiator selected from the group consisting of protonic acids, protonic acid anhydrides and protonic acid ester compounds having the molecular weight of 1000 or less per mol, and at least one protic acid salt having the molecular weight of 1000 or less per mol (Patent document 6).

PRIOR ART DOCUMENTS

Patent Documents

Patent document 1: Japanese Unexamined Patent Application Publication No. H8-325341

Patent document 2: Japanese Unexamined Patent Application Publication No. S58-98322

Patent document 3: Japanese Unexamined Patent Application Publication No. H7-90037

Patent document 4: Japanese Unexamined Patent Application Publication No. 2010-504380

Patent document 5: Japanese Unexamined Patent Application Publication No. 2013-28804

Patent document 6: Specification of International Patent Application Publication No. PCT/JP2014/067426

SUMMARY OF INVENTION

Problem to be Solved by the Invention

Trioxane, a starting material of an oxymethylene copolymer, is often blended with a basic compound as a stabilizer for the purpose of suppressing generation of paraformaldehyde during storage to enhance storage stability. The basic compound used as such a stabilizer, however, inhibits polymerization reaction in the above-described methods for producing an oxymethylene copolymer that use acidic compounds as polymerization initiators as disclosed by Patent documents 1-6. Therefore, usually, the basic compound is physically removed from the starting material trioxane by a process such as distillation before use, or an excess amount of polymerization initiator is used to cancel the inhibition action of the basic compound upon polymerization reaction.

The process of distillation, however, is not economically efficient, and excess use of the polymerization initiator makes it difficult to obtain a high molecular weight oxymethylene copolymer. Therefore, a method for producing an oxymethylene copolymer, which is economical and which is capable of producing a high molecular weight oxymethylene copolymer at high yield has been desired.

Thus, an objective of the present invention is to provide a method for producing an oxymethylene copolymer which is economical and which is capable of producing a high molecular weight oxymethylene copolymer at high yield, the method comprising subjecting copolymer starting materials including trioxane containing a basic compound as a stabilizer and a comonomer to polymerization reaction in the presence of a polymerization initiator made of an acidic compound, without requiring physical removal of the basic compound from trioxane, the comonomer or the copolymer starting materials or use of an excess amount of the polymerization initiator.

Means for Solving the Problem

The present inventors have gone through extensive investigation to solve the above-described problem, and as a result of which found that a high molecular weight oxymethylene copolymer can economically be produced at high yield by a method for producing an oxymethylene copolymer, the method comprising subjecting a copolymer starting material(s) comprising trioxane and a comonomer to polymerization reaction in the presence of a polymerization initiator comprising an acidic compound (A), wherein the copolymer starting material comprises a basic compound (B); an acidic compound (C) different from the acidic compound (A) is added to the copolymer starting material prior to the polymerization reaction to allow reaction between the basic compound (B) and the acidic compound (C) in advance; and the polymerization reaction is carried out through melt polymerization, thereby accomplishing the present invention.

Thus, the present invention is as follows.

[1] A method for producing an oxymethylene copolymer, the method comprising subjecting a copolymer starting material(s) comprising trioxane and a comonomer to polymerization reaction in the presence of a polymerization initiator comprising an acidic compound (A), wherein the copolymer starting material comprises a basic compound (B); an acidic compound (C) different from the acidic compound (A) is added to the copolymer starting material prior to the polymerization reaction to allow reaction between the basic compound (B) and the acidic compound (C) in advance; and the polymerization reaction is carried out through melt polymerization.

[1-1] A method for producing an oxymethylene copolymer, the method comprising subjecting copolymer starting materials comprising trioxane and a comonomer to polymerization reaction in the presence of a polymerization initiator comprising an acidic compound (A), wherein the copolymer starting material contains a basic compound (B); and an acidic compound (C) different from the acidic compound (A) is added to the copolymer starting material prior to the polymerization reaction to allow reaction between the basic compound (B) and the acidic compound (C) in advance.

[2] The method for producing an oxymethylene copolymer according to [1], wherein the basic compound (B) is added as a stabilizer to trioxane and/or the comonomer.

[3] The method for producing an oxymethylene copolymer according to [1] or [2], wherein the basic compound (B) is an amine compound.

[4] The method for producing an oxymethylene copolymer according to any one of [1]-[3], wherein the basic compound (B) is triethanolamine.

[5] The method for producing an oxymethylene copolymer according to any one of [1]-[4], wherein the content of the basic compound (B) in the copolymer starting material is 0.00001 mmol or more and 0.1 mmol or less per 1 mol of trioxane comprised in the copolymer starting material.

[6] The method for producing an oxymethylene copolymer according to any one of [1]-[5], wherein the acidic compound (C) is an acid having a sulfur atom in the molecule.

[7] The method for producing an oxymethylene copolymer according to any one of [1]-[6], wherein the acidic compound (C) is sulfuric acid and/or sulfurous acid.

[8] The method for producing an oxymethylene copolymer according to any one of [1]-[7], wherein the amount of the acidic compound (C) added is 0.01 mol or more and 2.0 mol or less per 1 mol of the basic compound (B) comprised in the copolymer starting materials.

[9] The method for producing an oxymethylene copolymer according to any one of [1]-[8], wherein the acidic compound (A) is one or more selected from the group consisting of protonic acids, protonic acid anhydrides and protonic acid esters.

[10] The method for producing an oxymethylene copolymer according to any one of [1]-[9], wherein the acidic compound (A) is one or more selected from the group consisting of perchloric acid, perfluoroalkyl sulfonic acid, acid anhydrides thereof and esters thereof.

[11] The method for producing an oxymethylene copolymer according to any one of [1]-[10], wherein the amount of the acidic compound (A) used for the polymerization reaction is 0.001 mass ppm or more and 10 mass % or less with respect to trioxane.

[12] The method for producing an oxymethylene copolymer according to any one of [1]-[11], wherein the polymerization reaction is carried out further in the presence of at least one protonic acid salt.

[13] The method for producing an oxymethylene copolymer according to [12], wherein the protonic acid salt is a salt made from protonic acid and one or more alkaline components selected from the group consisting of alkali metals, alkaline earth metals, compounds comprising the same, ammonia and amine.

[14] The method for producing an oxymethylene copolymer according to [12] or [13], wherein the amount of the protonic acid salt used for the polymerization reaction is 0.001 mass ppm or more and 10 mass % or less with respect to trioxane.

[15] The method for producing an oxymethylene copolymer according to any one of [12]-[14], wherein the molar ratio of the acidic compound (A) and the protonic acid salt is in a range of acidic compound (A):protonic acid salt=1:0.01-1:2000.

[16] The method for producing an oxymethylene copolymer according to any one of [1]-[15], wherein the polymerization reaction is carried further in the presence of ketone.

[17] The method for producing an oxymethylene copolymer according to any one of [1]-[16], wherein the polymerization reaction is carried out at a temperature of 135° C. or more and 300° C. or less.

[18] The method for producing an oxymethylene copolymer according to any one of [1]-[17], wherein stainless steel used in a device for producing trioxane and the comonomer used for the polymerization reaction and in a device for producing the oxymethylene copolymer is subjected, in advance, to one or more surface treatments selected from the group consisting of passivation treatment by washing with acid, high-temperature heat treatment, surface polishing and electrolytic polishing.

Effect of the Invention

The present invention is capable of providing a method for producing an oxymethylene copolymer which is economical and which is capable of producing a high molecular weight oxymethylene copolymer at high yield.

MODES FOR CARRYING OUT THE INVENTION

Hereinafter, the present invention will be described in detail. A method for producing an oxymethylene copolymer according to the present invention comprises subjecting a copolymer starting material(s) including trioxane and a comonomer to polymerization reaction in the presence of a polymerization initiator containing an acidic compound (A), wherein the copolymer starting materials) comprises a basic compound (B); and an acidic compound (C) different from the acidic compound (A) is added to the copolymer starting material(s) prior to the polymerization reaction to allow reaction between the basic compound (B) and the acidic compound (C) in advance.

This is because a high molecular weight oxymethylene copolymer can be produced at high yield without the above-described economical problems caused, for example, by physical removal of the basic compound (B) from the copolymer starting material or use of an excess amount of the polymerization initiator, by adding an acidic compound (C) different from the acidic compound (A) used as a polymerization initiator to the copolymer starting material including trioxane and a comonomer containing the basic compound (B) as a stabilizer prior to the polymerization reaction to allow reaction between the basic compound (B) and the acidic compound (C) in advance. Although the reason for this cannot be specified, a salt compound generated by the reaction between the basic compound (B) and the acidic compound (C) upon the polymerization reaction is considered to serve as a cocatalyst for polymerization reaction caused by the polymerization initiator containing the acidic compound (A). Surprisingly, such an effect is unique to melt polymerization and cannot be observed upon bulk polymerization. "Melt polymerization" as used herein refers to polymerization that is carried out while keeping the produced oxymethylene copolymer in a liquid state from addition of the polymerization initiator containing an acidic compound (A) to the copolymer starting material until addition of a polymerization terminator described below to the polymerization reaction product.

According to this production method, a high molecular weight oxymethylene copolymer can economically be produced at high yield without the need of physical removal of the basic compound (B) from trioxane, the comonomer or the copolymer starting material containing the basic compound (B) as a stabilizer or the need of use of an excess amount of the polymerization initiator, and its industrial meaning is extremely large in that it is excellent in terms of economic efficiency, molecular weight and yield.

[I. Copolymer Starting Material(s)]

The method for producing an oxymethylene copolymer according to the present invention uses copolymer starting material(s) including trioxane and a comonomer. The copolymer starting material(s) also contains a basic compound (B). Hereinafter, the basic compound (B), trioxane and the comonomer will be described.

<Basic Compound (B)>

According to the present invention, the type of the basic compound (B) that can be included in the copolymer starting material is not particularly limited as long as it is a basic substance. For example, it may be an amine compound such as a primary amine, a secondary amine, a tertiary amine, an amine compound having an alcoholic hydroxyl group in the molecular, an alkylated melamine or a hindered amine, or an ion or a hydroxide of a metal such as iron, chromium, nickel or molybdenum. Among them, an amine compound is preferable. One of them may be used alone or two or more of them may be used as a mixture.

As a primary amine, n-propylamine, isopropylamine, n-butylamine or the like may favorably be used. As a secondary amine, diethylamine, di-n-propylamine, diisopropylamine, di-n-butylamine, piperidine, morpholine or the like may favorably be used. As a tertiary amine, triethylamine, tri-n-propylamine, triisopropylamine, tri-n-butylamine or the like may favorably be used. An amine compound having an alcoholic hydroxyl group in the molecule refers to a compound having an alcoholic hydroxyl group and an amino group, which is, for example, monoethanolamine, diethanolamine, triethanolamine, N-methylethanolamine, N,N-dimethylethanolamine, N-ethylethanolamine, N,N-diethylethanolamine or the like may favorably be used. Here, an alcoholic hydroxyl group refers to a hydroxyl group that is not bound to a carbon of the aromatic ring. As an alkylated melamine, a methoxymethyl substituent of melamine, i.e., mono-, di-, tri-, tetra-, penta- or hexa-methoxymethyl melamine, or a mixture thereof can favorably be used. As a hindered amine, bis(2,2,6,6-tetramethyl-4-piperidinyl)sebacate, bis(1,2,2,6,6-pentamethyl-4-piperidinyl)sebacate, 1,2,3,4-butanetetracarboxylic acid tetrakis(2,2,6,6-tetramethyl-4-piperidinyl)ester, poly[[6-(1,1,3,3-tetramethylene butyl)amino-1,3,5-triazine-2,4-diyl][(2,2,6,6-tetramethyl-4-piperidinyl)imino]hexamethylene[(2,2,6,6-tetramethyl-4-piperidinyl)imino], 1,2,2,6,6,-pentamethylpiperidine, dimethyl succinate-1-(2-hydroxyethyl)-4-hydroxy-2,2,6,6-tetramethylpiperidine polycondensate, and N,N'-bis(3-aminopropyl)ethylenediamine-2,4-bis[N-butyl-N-(1,2,2,6,6-pentamethyl-4-piperidyl)amino]-1,3,5-triazine condensate or the like may favorably be used. As a metal hydroxide, for example, a hydroxide of Li, Na, K, Mg, Ba, Ca, Fe, Cr, Ni, Mo or the like may be used. Among them, an amine compound having an alcoholic hydroxyl group in the molecule may more favorably be used, while triethanolamine is most favorably used. One of them may be used alone or two or more of them may be used as a mixture. Unless an acidic compound (C) which will be described later is added to the copolymer starting material, these basic compounds (B) have the property of reacting with the polymerization initiator to make a salt which inhibits polymerization reaction.

While the amount of the basic compound (B) included in the copolymer starting material is not particularly limited, it is preferably 0.00001 mmol or more and 0.1 mmol or less, more preferably 0.00001 mmol or more and 0.01 mmol or less, and particularly preferably 0.00001 mmol or more and 0.005 mmol or less per 1 mol of trioxane included in the copolymer starting material. If the content of the basic compound (B) is 0.1 mmol or less, a high molecular weight oxymethylene copolymer is likely to be produced at high yield. Meanwhile, if the content of the basic compound (B) is 0.00001 mmol or more, generation of paraformaldehyde during storage of trioxane, the comonomer or the copolymer starting material is likely to be suppressed.

The above-described basic compound (B) may be added as a stabilizer to trioxane and/or the comonomer constituting the copolymer starting material. This is because addition of the basic compound (B) as a stabilizer to trioxane can suppress the amount of paraformaldehyde generated during storage of trioxane, the comonomer or the copolymer starting material. In particular, the above-described basic compound (B) is preferably added to trioxane as a stabilizer.

While the content of the basic compound (B) that may be contained in trioxane is not particularly limited, it is preferably 0.00001 mmol or more and 0.1 mmol or less, more preferably 0.00001 mmol or more and 0.01 mmol or less, and particularly preferably 0.00001 mmol or more and 0.005 mmol or less per 1 mol of trioxane. If the content of the basic compound (B) is 0.1 mmol or less, a high molecular weight oxymethylene copolymer is likely to be produced at high yield. Meanwhile, if the content of the basic compound (B) is 0.00001 mmol or more, the amount of paraformaldehyde generated during storage of trioxane, the comonomer or the copolymer starting material is likely to be suppressed.

While the content of the basic compound (B) that may be contained in the comonomer is not particularly limited, it is, when included as a copolymer starting material, preferably 0.00001 mmol or more and 0.1 mmol or less, more preferably 0.00001 mmol or more and 0.01 mmol or less, and particularly preferably 0.00001 mmol or more and 0.005 mmol or less per 1 mol of trioxane included in the copolymer starting material.

<Trioxane>

Trioxane that can be used for the present invention is a cyclic trimer of formaldehyde (1,3,5-trioxane). The method of producing trioxane is not particularly limited, and a commercially available product may be used. While trioxane may or may not contain the above-described basic compound (B) as a stabilizer, it preferably contains the basic compound (B).

Trioxane may contain impurities other than metal components, for example, water, formic acid, methanol, formaldehyde, methylal, dioxymethylene dimethyl ether, trioxymethylene dimethyl ether and the like which are inevitably generated upon industrial production of trioxane. The total amount of such impurities other than metal components is preferably 100 mass ppm or less, more preferably 70 mass ppm or less, and particularly preferably 50 mass ppm or less in trioxane. In particular, water is preferably 50 mass ppm or less, more preferably 20 mass ppm or less, and particularly preferably 10 mass ppm or less in trioxane.

<Comonomer>

The comonomer that can be used with the present invention is a comonomer that can copolymerize with trioxane, which is not particularly limited as long as it is a comonomer that gives an oxyalkylene unit with two or more carbons. Among them, a comonomer that gives an oxyalkylene unit with 2-6 carbons is preferable, and a comonomer that gives an oxyethylene unit with 2 carbons is particularly preferable. Examples of the comonomer include a cyclic ether, a glycidyl ether compound and a cyclic formal. Specifically, examples include ethylene oxide, propylene oxide, butylene oxide, styrene oxide, methyl glycidyl ether, ethylglycidyl ether, phenyl glycidyl ether, 1,3-dioxolane, propylene glycol formal, diethylene glycol formal, triethylene glycol formal, 1,3,5-trioxepane, 1,4-butanediol formal, 1,5-pentanediol formal and 1,6-hexanediol formal, where one or more selected from the group consisting of them are used. Among them, one or more selected from the group consisting of ethylene oxide, 1,3-dioxolane, diethylene glycol formal and 1,4-butanediol formal can favorably be used, and 1,3-dioxolane is particularly favorably used in terms of copolymerization property with trioxane.

The total amount of impurities other than the metal components, for example, water, formic acid, formaldehyde and the like contained in the comonomer is preferably 1000 mass ppm or less, more preferably 200 mass ppm or less, still more particularly preferably 100 mass ppm or less, and particularly preferably 50 mass ppm or less in the comonomer.

While the amount of the comonomer used is not particularly limited, it is preferably 0.4-45 parts by mass, more preferably 1.2-12 parts by mass, and particularly preferably 2.5-6.0 parts by mass with respect to 100 parts by mass of trioxane. If the amount of the comonomer used is 45 parts by mass or less, the polymerization yield and the crystallization rate are unlikely to be deteriorated, while unstable moiety can be reduced if it is 0.4 parts by mass or more.

[II. Polymerization Reaction]

According to the method for producing an oxymethylene copolymer of the present invention, the above-described copolymer starting material(s) is subjected to polymerization reaction through melt polymerization in the presence of a polymerization initiator containing an acidic compound (A). In doing so, an acidic compound (C) different from the acidic compound (A) is added to the copolymer starting material prior to the polymerization reaction to allow the basic compound (B) to react with the acidic compound (C) in advance. According to the present invention, "prior to the polymerization reaction" means that it precedes addition of the polymerization initiator containing the acidic compound (A) to the copolymer starting material for initiating polymerization reaction. Specifically, "addition of an acidic compound (C) different from the acidic compound (A) to the copolymer starting material prior to the polymerization reaction in advance" also comprises addition of the acidic compound (C) different from the acidic compound (A) to trioxane and/or the comonomer included in the copolymer starting material. Therefore, an acidic compound (C) may be added to the copolymer starting material immediately before addition of a polymerization initiator containing an acidic compound (A) to the copolymer starting material, or may be added to trioxane and/or a comonomer constituting the copolymer starting material. Above all, it is preferable to add an acidic compound (C) to the copolymer starting material immediately before addition of a polymerization initiator containing an acidic compound (A) to the copolymer starting material since a high molecular weight oxymethylene copolymer is likely to be produced at high yield. Hereinafter, an acidic compound (A), an acidic compound (C), other compounds that may be used for polymerization reaction, conditions for polymerization reaction, and the like will be described.

<Acidic Compound (A)>

According to the present invention, polymerization reaction takes place in the presence of a polymerization initiator containing an acidic compound (A), where the acidic compound (A) is used as an initiator for the polymerization reaction (polymerization initiator). The acidic compound (A) is not particularly limited as long as it is an acidic substance capable of copolymerizing with trioxane and the comonomer through melt polymerization. As such a compound, for example, one or more selected from the group consisting of protonic acid, protonic acid anhydrides and protonic acid ester compounds that are generally used as a cationic polymerization initiator for copolymerization between trioxane and the comonomer may be used. While the protonic acid, the protonic acid anhydride and the protonic acid ester compound are not particularly limited, they may be, for example, a perchloric acid such as perchloric acid, a perchloric acid anhydride or acetyl perchlorate, an anhydride of perchloric acid or an ester compound of perchloric acid; a fluorinated or chlorinated alkyl sulfonic acid or aryl sulfonic acid such as trifluoromethane sulfonic acid or a trifluoromethane sulfonic acid anhydride, an acid anhydride thereof or an ester compound thereof; or a phosphinic acid or a phosphonic acid such as bis(trifluoromethyl) phosphinic acid or trifluoromethyl phosphonic acid, an acid anhydride thereof or an ester compound thereof. One of them may be used alone or two or more of them may be used as a mixture. Among them, one or more selected from the group consisting of perchloric acids, perfluoroalkyl sulfonic acid, acid anhydrides thereof and ester compounds thereof are preferable, and one or more selected from the group consisting of perchloric acids, perchloric acid anhydrides and perchloric acid ester compounds are most preferable considering the production efficiency and economic efficiency.

While the molecular weight of the acidic compound (A) is not particularly limited, the molecular weight per mol is preferably 1000 or less, more preferably 800 or less and particularly preferably 500 or less for easily producing a high molecular weight oxymethylene copolymer at high yield. While the minimum molecular weight of the acidic compound (A) per mol is not particularly limited, it is, for example, 20 or more, and preferably 36 or more.

Specifically, the acidic compound (A) is preferably one or more selected from the group consisting of protonic acids, protonic acid anhydrides and protonic acid ester compounds having a molecular weight of 1000 or less per mol, more preferably one or more selected from the group consisting of protonic acids, protonic acid anhydrides and protonic acid ester compounds having a molecular weight of 800 or less per mol, and particularly preferably one or more selected from the group consisting of protonic acids, protonic acid anhydrides and protonic acid ester compounds having a molecular weight of 500 or less per mol.

While the amount of the acidic compound (A) used upon polymerization reaction (content in the polymerization reaction system) is not particularly limited, it is preferably 0.001 mass ppm or more and 10 mass % or less, more preferably 0.001 mass ppm or more and 500 mass ppm or less, still more preferably 0.01 mass ppm or more and 200 mass ppm or less, and particularly preferably 0.01 mass ppm or more and 100 mass ppm or less with respect to the main monomer, i.e., trioxane. If the amount of the acidic compound (A) used is 0.001 mass ppm or more, deterioration of the polymerization conversion rate is unlikely to occur. Moreover, if the amount of the acidic compound (A) used is 10 mass % or less, the molecular weight of the resulting oxymethylene copolymer is hardly decreased.

The acidic compound (A) may be added to the copolymer starting material alone or in a form of liquid. Specifically, all or part of the acidic compound (A) may be diluted in a solvent before it is added. While the solvent used for addition in a liquid form is not particularly limited, examples include aliphatic hydrocarbon solvents such as hexane, heptane and cyclohexane; aromatic hydrocarbon solvents such as benzene, toluene and xylene; and ether solvents such as 1,2-dimethoxyethane, diethylene glycol dimethyl ether, triethylene glycol dimethyl ether and 1,4-dioxane. Among them, solvents whose boiling point at 1 atm is 115° C. or lower are preferable. Such a solvent can easily be separated from the generated oxymethylene copolymer and the collected trioxane by distillation. Furthermore, a partial or whole amount of the comonomer such as 1,3-dioxolane may be used as the solvent.

<Acidic Compound (C)>

According to the present invention, the acidic compound (C) is not particularly limited as long as it is an acidic substance that is different from the above-described acidic compound (A). Among them, those whose capacity to polymerize with trioxane and the comonomer is weaker than that of the acidic compound (A) are preferably used. Seemingly, the acidic compound (A) serves as a primary catalyst upon polymerization reaction while the salt resulting from the acidic compound (C) and the basic compound (B) effectively serves as a cocatalyst when the acidic compound (A) highly capable of polymerizing with trioxane and the comonomer, and the acidic compound (C) whose capacity to polymerize with trioxane and the comonomer is weaker than that of the acidic compound (A) are used. As a result, a high molecular weight oxymethylene copolymer is likely to be produced at high yield. Examples of such an acidic compound (C) include inorganic acids such as sulfuric acid, hydrochloric acid, nitric acid, hydrofluoric acid, phosphoric acid, boric acid, carbonic acid, sulfurous acid, nitrous acid and phosphorous acid; sulfonic acids such as methylsulfonic acid and benzene sulfonic acid; carboxylic acids such as formic acid and acetic acid.

Among them, an acid that contains a sulfur atom in the molecule is preferably used. While the acid that contains a sulfur atom in the molecule is not particularly limited, it may, for example, be a sulfonic acid such as sulfuric acid, sulfurous acid, methylsulfonic acid or benzene sulfonic acid. Among them, sulfuric acid and/or sulfurous acid is particularly preferable in that it exerts the effect of the present invention for sure. One of the above-mentioned acids may be used alone or two or more of them may be used as a mixture.

While the amount of the acidic compound (C) added is not particularly limited since it is suitably adjusted according to the content of the basic compound (B) in the copolymer starting material, it is preferably 0.01 mol or more and 2.0 mol or less, more preferably 0.01 mol or more and 1.0 mol or less and particularly preferably 0.1 mol or more and 1.0 mol or less per 1 mol of the basic compound (B) contained in the copolymer starting material. If the amount of the acidic compound (C) added is 0.01 mol or more, the polymerization reaction is unlikely to be inhibited by the basic compound (B). In addition, since cocatalyst action caused by the salt compound resulting from the reaction between the basic compound (B) and the acidic compound (C) is also assumed to occur effectively, a high molecular weight oxymethylene copolymer is likely to be produced at high yield. Meanwhile, if the amount of the acidic compound (C) added is 2.0 mol or less, a low molecular weight polymer that causes deterioration of the physical properties due to an excess amount of the acidic compound (C) is unlikely to be generated. In particular, if an acidic compound (C) is not added, the molecular weight and the polymerization yield of the resulting oxymethylene copolymer tend to be low although the polymerization reaction can take place by using the acidic compound (A) in an amount sufficiently greater than the content of the basic compound (B) contained in the copolymer starting material.

<Salt of Protonic Acid>

According to the present invention, the polymerization reaction may take place in the presence of at least one protonic acid salt in addition to the above-described acidic compound (A). By doing so, the molecular weight and the polymerization yield of the resulting oxymethylene copolymer may increase. While the reason for this is not particularly limited, it is assumed that combinational use of the acidic compound (A) and the protonic acid salt suppresses decomposition reaction of the copolymer undergoing polymerization and the growth reaction of the copolymer becomes relatively dominant. Furthermore, since the protonic acid salt exists at a favorable location near the active site of the copolymer at a polymerization temperature of 135° C. or higher, decomposition reaction generally called back-biting, namely, attack by the active site of the copolymer to the copolymer itself, is assumed to be suppressed.

The protonic acid salt is not particularly limited as long as it is a salt generated from an alkaline component and a protonic acid. For example, a salt generated from a cation derived from an alkaline component and an anion derived from a protonic acid may be used. In terms of production efficiency, the protonic acid salt is preferably a salt generated from a protonic acid and one or more alkaline components selected from the group consisting of alkali metals, alkaline earth metals, compounds containing the same, ammonia and amine compounds. More preferably, the alkaline components are one or more selected from the group consisting of alkali metals, alkaline earth metals and compounds containing the same.

While the protonic acid constituting the protonic acid salt is not particularly limited as long as it is a compound that discharges proton, it is preferably a protonic acid having a molecular weight of preferably 1000 or less per mol, more preferably a protonic acid having a molecular weight of 800 or less per mol, and particularly preferably a protonic acid having a molecular weight of 500 or less per mol, in order to produce a high molecular weight oxymethylene copolymer at high yield. While the minimum molecular weight per 1 mol of the protonic acid constituting the protonic acid salt is not particularly limited, a molecular weight per mol is, for example, 20 or more, and preferably 36 or more. Examples of such a protonic acid include inorganic acids such as sulfuric acid, hydrochloric acid, phosphoric acid and perchloric acid; and organic acids such as fluorinated or chlorinated alkyl sulfonic acid or aryl sulfonic acid. Among them, it is preferably one or more types selected from the group consisting of perchloric acid and perfluoroalkyl sulfonic acid, and particularly preferably perchloric acid considering the production efficiency and the economic efficiency.

While the alkaline component (basic component) constituting the protonic acid salt is not particularly limited, it is preferably one or more selected from the group consisting of alkali metals, alkaline earth metals, compounds containing the same, ammonia and amine compounds, and more preferably one or more selected from the group consisting of alkali metals, alkaline earth metals and compounds containing the same, in order to produce a high molecular weight oxymethylene copolymer at high yield. The alkali metals are not particularly limited, and, for example, lithium, sodium, potassium, rubidium or cesium may be used. The alkaline earth metals are not particularly limited as long as they are alkaline earth metals in a broad sense, and, for example, beryllium, magnesium, calcium, strontium, barium or radium may be used. The amine compounds are not particularly limited, and a primary amine, a secondary amine, a tertiary amine, an alkylated melamine or a hindered amine may be used. As the primary amine, n-propylamine, isopropylamine, n-butylamine or the like may favorably be used. As the secondary amine, diethylamine, di-n-propylamine, diisopropylamine, di-n-butylamine, piperidine, morpholine or the like may favorably be used. As the tertiary amine, triethylamine, tri-n-propylamine, triisopropylamine, tri-n-butylamine or the like may favorably be used. As the alkylated melamine, a methoxymethyl substituent of melamine, namely, mono-, di-, tri-, tetra-, penta- or hexamethoxymethyl melamine, or a mixture thereof may favorably be used. As the hindered amine, bis(2,2,6,6-tetramethyl-4-piperidinyl)sebacate, bis(1,2,2,6,6-pentamethyl-4-piperidinyl)sebacate, 1,2,3,4-butanetetracarboxylic acid tetrakis(2,2,6,6-tetramethyl-4-piperidinyl)ester, poly[[6-(1,1,3,3-tetramethylene butyl)amino-1,3,5-triazine-2,4-diyl][(2,2,6,6-tetramethyl-4-piperidinyl)imino]hexamethylene[(2,2,6,6-tetramethyl-4-piperidinyl)imino], 1,2,2,6,6,-pentamethylpiperidine, dimethyl succinate-1-(2-hydroxyethyl)-4-hydroxy-2,2,6,6-tetramethylpiperidine polycondensate, and N,N'-bis(3-aminopropyl)ethylenediamine-2,4-bis[N-butyl-N-(1,2,2,6,6-pentamethyl-4-piperidyl)amino]-1,3,5-triazine condensate or the like may favorably be used.

As the protonic acid salt, a pure substance, namely, a compound isolated as a salt may be used, or a substance (salt) generated through acid-alkali reaction may be used without purification. As an alkaline component used for the substance generated through acid-alkali reaction without purification, a simple substance of an alkali metal, a simple substance of an alkaline earth metal, ammonia, an amine compound, a hydroxide of an alkali metal or an alkaline earth metal, alcoholate, an organic acid salt, an inorganic acid salt, an oxide or the like can favorably be used.

In a case where a protonic acid salt is used for the polymerization reaction, the amount of the protonic acid salt used (content in the polymerization reaction system) is not particularly limited, but it is preferably 0.001 mass ppm-10 mass %, more preferably 0.01 mass ppm-1 mass % and particularly preferably 0.01 mass ppm-100 mass ppm with respect to the main monomer, i.e., trioxane. The molecular weight and the polymerization yield of the oxymethylene copolymer are unlikely to decrease if the amount of the protonic acid salt used is less than 10 mass % while the molecular weight of the oxymethylene copolymer is likely to increase if it is 0.001 mass ppm or more.

In a case where a protonic acid salt is used for the polymerization reaction, the protonic acid salt may be used alone or in a form of a solution or a suspension. Specifically, whole or part of the protonic acid salt may be diluted in a solvent upon use. While the solvent for use as a solution or a suspension is not particularly limited, examples thereof include aliphatic hydrocarbon solvents such as hexane, heptane and cyclohexane; aromatic hydrocarbon solvents such as benzene, toluene and xylene; and ether solvents such as 1,2-dimethoxyethane, diethylene glycol dimethyl ether, triethylene glycol dimethyl ether and 1,4-dioxane. Among them, a solvent whose boiling point at 1 atm is 115° C. or lower is favorable. Such a solvent can easily be separated from the generated oxymethylene copolymer and the collected trioxane by distillation. Furthermore, a partial or whole amount of the monomer or the comonomer such as trioxane or 1,3-dioxolane may be used as the solvent. Moreover, it may be used by mixing with the acidic compound (A) in advance. According to the present invention, the acidic compound (A) and the protonic acid salt may be used by diluting whole or part of them in a solvent whose boiling point at 1 atm is 115° C. or lower.

In a case where a protonic acid salt is used for the polymerization reaction, the molar ratio of the acidic compound (A) and the protonic acid salt is not particularly limited, but it is preferably in a range of 1:0.01-1:2000, more preferably in a range of 1:0.05-1:10 and most preferably in a range of 1:0.1-1:5 in terms of the molecular weight and the polymerization yield of the resulting oxymethylene copolymer.

<Ketone>

According to the present invention, polymerization reaction may take place in the presence of ketone in addition to the above-described acidic compound (A). Alternatively, polymerization reaction may take place in the presence of ketone in addition to the above-described acidic compound (A) and protonic acid salt. In particular, polymerization reaction preferably takes place in the presence of the acidic compound (A), the protonic acid salt and ketone. Combinational use of ketone with the acidic compound (A), preferably the acidic compound (A) and the protonic acid salt, is likely to effectively increase the molecular weight and the polymerization yield of the oxymethylene copolymer even at a higher polymerization temperature as compared to the case where only the acidic compound (A) and the protonic acid salt are used. The reason for this is assumed, for example, to be because that combinational use of ketone suppresses decomposition reaction of the copolymer undergoing polymerization and the growth reaction of the copolymer becomes relatively dominant.

Ketone is not particularly limited as long as it is an aliphatic ketone or an aromatic ketone. As ketone, one or more selected from the group consisting of acetone, methyl ethyl ketone, methyl-n-propyl ketone, diethyl ketone, 2-hexanone, 3-hexanone, methyl-t-butyl ketone, di-n-propyl ketone, diisopropyl ketone, diisobutyl ketone, di-n-amyl ketone, stearone, chloroacetone, s-dichloroacetone, diacetyl, acetyl acetone, mesityl oxide, phorone, cyclohexanone and benzophenone may favorably be used. One of them may be used alone or two or more of them may be used as a mixture. Among them, one or more selected from the group consisting of acetone, methyl ethyl ketone, methyl-n-propyl ketone, diethyl ketone, 2-hexanone, 3-hexanone, methyl-t-butyl ketone, di-n-propyl ketone, diisopropyl ketone, diisobutyl ketone, di-n-amyl ketone, diacetyl, acetyl acetone, cyclohexanone and benzophenone are more preferable, and acetone is most preferable.

In a case where ketone is used for the polymerization reaction, the amount of ketone (content in the polymerization reaction system) is not particularly limited, but it is preferably 0.001 mass ppm-30 mass %, more preferably 0.01 mass ppm-1 mass % and particularly preferable 0.1 mass ppm-0.5 mass % with respect to the main monomer, i.e., trioxane. The molecular weight and the polymerization yield of the oxymethylene copolymer are unlikely to decrease if the amount of ketone used is 30 mass % or less while the molecular weight and the polymerization yield of the oxymethylene copolymer is likely to increase if it is 0.001 mass ppm or more.

In a case where ketone is used for the polymerization reaction, ketone may be used alone or in a form of a solution. Specifically, whole or part of ketone may be diluted in a solvent upon use. While the solvent for use as a solution is not particularly limited, examples include aliphatic hydrocarbon solvents such as hexane, heptane and cyclohexane; aromatic hydrocarbon solvents such as benzene, toluene and xylene; and ether solvents such as 1,2-dimethoxyethane, diethylene glycol dimethyl ether, triethylene glycol dimethyl ether and 1,4-dioxane. Among them, a solvent whose boiling point at 1 atm is 115° C. or lower is favorable. Such a solvent can easily be separated from the generated oxymethylene copolymer and the collected trioxane by distillation. Furthermore, a partial or whole amount of the comonomer such as 1,3-dioxolane may be used as the solvent.

In a case where ketone is used for the polymerization reaction, the molar ratio of the acidic compound (A) and ketone is not particularly limited, but it is preferably in a range of 1:0.1-1:100000, more preferably in a range of 1:5-1:10000 and most preferably in a range of 1:50-1:5000 in terms of the molecular weight and the polymerization yield of the resulting oxymethylene copolymer.

<Molecular Weight Modifier>

According to the present invention, the polymerization reaction may take place in the presence of a molecular weight modifier. In order to adjust the molecular weight of the oxymethylene copolymer, for example, a molecular weight modifier may be used at 0.01 mass ppm-10 mass % with respect to trioxane. The amount of the molecular weight modifier used is more preferably 0.1 mass ppm-1 mass %. The molecular weight modifier is not particularly limited, and, for example, one or more selected from the group consisting of carboxylic acid, a carboxylic acid anhydride, an ester, an amide, an imide, a phenol compound and an acetal compound may be used. Among them, one or more selected from the group consisting of phenol, 2,6-dimethylphenol, methylal and polyoxymethylene dimethoxide are more preferably used. Methylal is particularly preferable.

The molecular weight modifier may be used alone or in a form of a solution. Specifically, all or part of the molecular weight modifier may be diluted in a solvent upon use. While the solvent for use as a solution is not particularly limited, examples include aliphatic hydrocarbon solvents such as hexane, heptane and cyclohexane; aromatic hydrocarbon solvents such as benzene, toluene and xylene; and ether solvents such as 1,2-dimethoxyethane, diethylene glycol dimethyl ether, triethylene glycol dimethyl ether and 1,4-dioxane. Among them, a solvent whose boiling point at 1 atm is 115° C. or lower is favorable. Such a solvent can easily be separated from the generated oxymethylene copolymer and the collected trioxane by distillation. Furthermore, a partial or whole amount of the comonomer such as 1,3-dioxolane may be used as the solvent.

<Sterically Hindered Phenol Compound>

According to the present invention, the polymerization reaction may take place in the presence of a sterically hindered phenol compound. In a case where a sterically hindered phenol compound is used, the amount used is preferably 0.0001-2.0 mass %, more preferably 0.001-0.5 mass % and still more preferably 0.002-0.1 mass % with respect to trioxane. The molecular weight and the polymerization yield of the oxymethylene copolymer are unlikely to decrease if the amount of sterically hindered phenol compound used is 2.0 mass % or less, while generation of an unstable moiety such as a formic acid ester terminal structure in the oxymethylene copolymer can be suppressed and thus deterioration of heat or hydrolysis stability is unlikely to occur if it is 0.0001 mass % or more.

In a case where a sterically hindered phenol compound is used, the sterically hindered phenol compound is added to trioxane alone or in a form of a solution. The solvent for use as a solution is not particularly limited, and examples include aliphatic hydrocarbon solvents such as hexane, heptane and cyclohexane; aromatic hydrocarbon solvents such as benzene, toluene and xylene; and ether solvents such as 1,2-dimethoxyethane, diethylene glycol dimethyl ether, triethylene glycol dimethyl ether and 1,4-dioxane. Among them, a solvent whose boiling point at 1 atm is 115° C. or lower is favorable. Such a solvent can easily be separated from the generated oxymethylene copolymer and the collected trioxane by distillation. Furthermore, a partial or whole amount of the comonomer such as 1,3-dioxolane may be used as the solvent. In order to maintain the activity of the sterically hindered phenol compound during the polymerization reaction, the sterically hindered phenol compound is preferably added alone or in a form of a solution at the inlet of a device used for polymerization reaction (e.g., a polymerizer).

While the sterically hindered phenol compound used for the polymerization reaction is not particularly limited, examples include, but not particularly limited to, dibutylhydroxytoluene, triethylene glycol-bis-3-(3-t-butyl-4-hydroxy-5-methyl phenyl)propionate, pentaerythrityl-tetrakis-3-(3,5-di-t-butyl-4-hydroxyphenyl)propionate, hexamethylene bis[3-(3,5-di-t-butyl-4-hydroxyphenyl)propionate], 2,2'-methylene bis(6-t-butyl-4-methyl phenol), 3,9-bis {2-[3-(3-t-butyl-4-hydroxy-5-methyl phenyl]propionyloxy)-1,1-dimethylethyl}-2,4,8,10-tetraoxaspiro[5,5]undecane, N,N'-hexane-1,6-diylbis[3-(3,5-di-t-butyl-4-hydroxyphenyl)propionamide] and 3,5-bis(1,1-dimethylethyl)-4-hydroxy benzenepropionic acid 1,6-hexanediylester, and it is preferably one or more selected from the group consisting of them. Among them, one or more selected from the group consisting of triethylene glycol-bis-3-(3-t-butyl-4-hydroxy-5-methyl phenyl)propionate, pentaerythrityl-tetrakis-3-(3,5-di-t-butyl-4-hydroxyphenyl)propionate and 3,9-bis{2-[3-(3-t-butyl-4-hydroxy-5-methyl phenyl]propionyloxy)-1,1-dimethylethyl}-2,4,8,10-tetraoxaspiro[5,5]undecane are more preferably used, and triethylene glycol-bis-3-(3-t-butyl-4-hydroxy-5-methyl phenyl)propionate is most preferably used.

<Conditions, Method and Device for Polymerization Reaction>

According to the present invention, the polymerization temperature is a temperature that can maintain the generated oxymethylene copolymer in a molten state (a liquid state) from addition of the polymerization initiator containing the acidic compound (A) to the copolymer starting material until addition of the later-described polymerization terminator to the polymerization reaction product. Such a temperature is, for example, 135-300° C. When ketone is not used in combination, the polymerization temperature is preferably 140-220° C. and particularly preferably 140-190° C. When ketone is used in combination, it is preferably 140-220° C. and particularly preferably 140-205° C. Specifically, the polymerization reaction is preferably carried out while maintaining the above-described polymerization temperature from the addition of the polymerization initiator containing the acidic compound (A) until the addition of the polymerization terminator. The molecular weight and the polymerization yield of the generated oxymethylene copolymer are unlikely to be decreased if the polymerization temperature is 300° C. or lower while, if it is 135° C. or higher, the generated oxymethylene copolymer is unlikely to be precipitated as a solid so that an oxymethylene copolymer can be produced with a simple polymerization equipment (reactor) that treats the oxymethylene copolymer as liquid.

While the polymerization pressure is not particularly limited as long as it is under a pressurized condition higher than the vapor pressure in the polymerizer, it is preferably 0.15-50 MPa and more preferably 0.15-20 MPa.

If polymerization is carried out at a temperature that can maintain the generated oxymethylene copolymer in a liquid state from addition of the polymerization initiator containing the acidic compound (A) until the addition of the polymerization terminator (i.e., melt polymerization), heat quantity larger than the reaction heat needs to be provided externally since the polymerization reaction is weak endothermic reaction. Otherwise, the temperature of the polymerization reaction product becomes lower as the polymerization proceeds. On the other hand, if polymerization is carried out at a temperature that cannot maintain the generated oxymethylene copolymer in a liquid state from addition of the polymerization initiator containing the acidic compound (A) until addition of the polymerization terminator (e.g., bulk polymerization), heat (crystallization heat) generated upon crystallization of the copolymer will exceed the heat absorbed upon the polymerization reaction. Therefore, the temperature of the polymerization reaction product will increase as the polymerization proceeds unless an amount of heat larger than that of the difference in the heat is removed outside. Accordingly, if the internal temperature resulting from polymerization is largely increased, it is judged that precipitation of the copolymer is occurring. Therefore, according to the present invention, polymerization reaction is preferably carried out at a polymerization temperature that is sufficiently high so that the maximum difference in the temperature from addition of the polymerization initiator containing the acidic compound (A) until addition of the polymerization terminator is kept smaller than 20° C. without the need of major heat removal. By carrying out the polymerization reaction as described above, troubles caused by precipitation of the oxymethylene copolymer during polymerization reaction can be prevented even if production is carried out with a simple and inexpensive polymerization equipment like a static-mixer-type reactor. Furthermore, since melt polymerization allows kneading with an additive in a molten state in an extruder, melt polymerization is favorable in terms of economic efficiency as compared to methods such as bulk polymerization that require additional heating for melting and kneading with an additive after a complete solidification. From these viewpoints, melt polymerization is more preferable than bulk polymerization.

While the polymerization time from addition of the polymerization initiator containing the acidic compound (A) until addition of the polymerization terminator according to the present invention is not particularly limited, it is preferably 0.1-20 minutes and more preferably 0.4-5 minutes. Depolymerization is unlikely to occur if the polymerization time is shorter than 20 minutes while the polymerization yield is enhanced if the polymerization time is 0.1 minutes or longer.

While the polymerization yield upon the polymerization reaction is not particularly limited, it is usually 30% or more and more preferably 60% or more, and thus the polymerization reaction is carried out under conditions that give such polymerization yield.

According to the present invention, while polymerization reaction may be carried out through solution polymerization in the presence of an inert solvent, polymerization reaction is preferably carried out through non-solvent polymerization substantially in the absence of a solvent so that the cost for collecting the solvent is unnecessary. In a case where a solvent is used, examples of the solvent include, but not particularly limited to, aliphatic hydrocarbon solvents such as hexane, heptane and cyclohexane; aromatic hydrocarbon solvents such as benzene, toluene and xylene; and ether solvents such as 1,2-dimethoxyethane, diethylene glycol dimethyl ether, triethylene glycol dimethyl ether and 1,4-dioxane. Among them, solvents whose boiling point at 1 atm is 115° C. or lower are preferable. Such a solvent can easily be separated from the generated oxymethylene copolymer and the collected trioxane by distillation.

While the type of polymerization reaction may be either batch or continuous, continuous polymerization is more preferable for industrial purpose. Examples of the apparatus used for the polymerization reaction (polymerization reactor) include a shell-type reactor, a blade mixer, a tube-type reactor, a List-type reactor, a kneader (e.g., Buss kneader), an extruder with a single- or double-screw, a dynamic-mixer-type reactor and a static-mixer-type reactor. Among them, a driver-free static-mixer-type reactor equipped with static-type stirring elements is preferable. The internal static-type stirring elements of the static-mixer-type reactor are not particularly limited, and various types such as those disclosed, for example, in Japanese Unexamined Patent Application Publication No. 2004-339271 and Japanese Patent No. 5502280 may be used. In particular, those configured with two types of elements with right and left twists made by twisting a rectangular plate at 180 degrees, or those configured with crossing plate lattice can favorably be used.

According to the present invention, stainless steel used in a device for producing trioxane and a comonomer used for the above-described polymerization reaction and in a device for producing an oxymethylene copolymer (polymerization reactor) is preferably subjected to one or more surface treatments selected from the group consisting of passivation treatment by washing with acid, high-temperature heat treatment, surface polishing and electrolytic polishing in advance. These surface treatments may be carried out alone or two or more of them may be carried out in combination. The above-described surface treatment can suppress inhibition of the polymerization reaction, increase in the amount of the formic acid ester terminal group contained in the generated oxymethylene copolymer, increase in the quantity of formaldehyde generated in high temperature/high humidity environment, or elution of the metal component (e.g., Na, Fe, Cr, Ni, Mo), which causes an increase of the low molecular weight components in the generated oxymethylene copolymer into trioxane, the comonomer, the copolymer starting material or the like used for the polymerization reaction. Specifically, it is most preferable that at least the inner surface of the stainless steel member in the production equipment, the storage equipment, the conveying pipes, the polymerization equipment and the like for trioxane and the comonomer, which makes contact with trioxane and the comonomer, is washed with acid, washed with pure water and subjected to a high-temperature heat treatment in the air at 350° C. for 7 hours so that elution of the metal components can be suppressed in relatively short time.

The intrinsic viscosity of the oxymethylene copolymer obtained by the present invention is not particularly limited since it is adjusted to suit the application, but it is preferably adjusted to 0.5-5 dl/g. The intrinsic viscosity is more preferably adjusted to 0.7-3.5 dl/g and particularly preferably adjusted to 0.9-2.5 dl/g. The oxymethylene copolymer can be used for usual application if the intrinsic viscosity is 0.5 dl/g or more while the mechanical strength of the oxymethylene copolymer will be improved and thus the oxymethylene copolymer can be used for applications that require mechanical strength if the intrinsic viscosity is 0.9 dl/g or more.

[III. Termination of Polymerization Reaction]

A method for producing an oxymethylene copolymer according to the present invention may comprise adding and mixing a polymerization terminator to the polymerization reaction product to terminate the polymerization reaction. Specifically, a method for producing an oxymethylene copolymer according to the present invention preferably comprises, in addition to the step of allowing polymerization reaction, a step of adding a polymerization terminator.

<Polymerization Terminator>

Examples of the polymerization terminator include, but not particularly limited to, amine compounds such as a primary amine, a secondary amine, a tertiary amine, an alkylated melamine and a hindered amine; a trivalent organic phosphorus compound; alkali metal salts such as hydroxides of alkali metals and alcoholates of alkali metals, and alkaline earth metal salts such as hydroxides of alkaline earth metals and alcoholates of alkaline earth metals, where one or more selected from the group consisting of them is preferable. In particular, the polymerization terminator is preferably one or more selected from the group consisting of an amine compound, a hydroxide of an alkali metal, an alcoholate of an alkali metal, a hydroxide of an alkaline earth metal or an alcoholate of an alkaline earth metal. The polymerization terminator may be used alone or as a mixture.

As a primary amine, n-propylamine, isopropylamine, n-butylamine or the like may favorably be used. As a secondary amine, diethylamine, di-n-propylamine, diisopropylamine, di-n-butylamine, piperidine, morpholine or the like may favorably be used. As a tertiary amine, triethylamine, tri-n-propylamine, triisopropylamine, tri-n-butylamine, tri-n-octylamine or the like may favorably be used. As an alkylated melamine, a methoxymethyl substituent of melamine, i.e., mono-, di-, tri-, tetra-, penta- or hexa-methoxymethyl melamine, or a mixture thereof can favorably be used. As a hindered amine, bis(2,2,6,6-tetramethyl-4-piperidinyl) sebacate, bis(1,2,2,6,6-pentamethyl-4-piperidinyl)sebacate, 1,2,3,4-butanetetracarboxylic acid tetrakis(2,2,6,6-tetramethyl-4-piperidinyl)ester, poly[[6-(1,1,3,3-tetramethylene butyl)amino-1,3,5-triazine-2,4-diyl][(2,2,6,6-tetramethyl-4-piperidinyl)imino]hexamethylene[(2,2,6,6-tetramethyl-4-piperidinyl)imino], 1,2,2,6,6,-pentamethylpiperidine, dimethyl succinate-1-(2-hydroxyethyl)-4-hydroxy-2,2,6,6-tetramethylpiperidine polycondensate, and N,N-bis(3-aminopropyl)ethylenediamine-2,4-bis[N-butyl-N-(1,2,2,6,6-pentamethyl-4-piperidyl)amino]-1,3,5-triazine condensate or the like may favorably be used. As a hydroxide or an alcoholate of an alkali metal or an alkaline earth metal, lithium hydroxide, sodium hydroxide, potassium hydroxide, lithium methoxide, sodium methoxide, potassium methoxide, lithium ethoxide, sodium ethoxide, potassium ethoxide, magnesium hydroxide, calcium hydroxide, magnesium methoxide, calcium methoxide, magnesium ethoxide, calcium ethoxide or the like may favorably be used.

Among the above-listed polymerization terminators, the polymerization terminator is more preferably one or more selected from the group consisting of a hindered amine, an alkylated melamine, a hydroxide of an alkali metal and an alcoholate of an alkali metal because the unreacted monomer can easily be separated from the monomer by evaporation. Among the above-mentioned compounds as such a polymerization terminator, the hindered amine is more preferably bis(2,2,6,6-tetramethyl-4-piperidinyl)sebacate, bis(1,2,2,6,6-pentamethyl-4-piperidinyl)sebacate, dimethyl succinate-1-(2-hydroxyethyl)-4-hydroxy-2,2,6,6-tetramethylpiperidine polycondensate or N,N'-bis(3-aminopropyl)ethylenediamine-2,4-bis[N-butyl-N-(1,2,2,6,6-pentamethyl-4-piperidyl)amino]-1,3,5-triazine condensate. As the alkylated melamine, hexamethoxymethyl melamine is more preferable. As the hydroxide or the alcoholate of an alkali metal, sodium hydroxide or sodium methoxide is more preferable. Among them, sodium methoxide is most preferable.

Furthermore, it is more preferable to employ a method that uses an amine compound with a hydroxide or an alcoholate of an alkali metal or an alkaline earth metal in combination as a polymerization terminator since adverse effects such as coloring caused by excessive alkali metal or alkaline earth metal or decrease in the molecular weight of the oxymethylene copolymer can be suppressed. In particular, a method that uses an amine compound and sodium methoxide in combination is most preferable.

The polymerization terminator may be used alone or in a form of a solution or a suspension. Specifically, whole or part of the polymerization terminator may be diluted in a solvent upon use. The solvent for using the polymerization terminator in a form of a solution or a suspension is not particularly limited. Besides water or alcohol solvents, various aliphatic and aromatic organic solvents such as acetone, methyl ethyl ketone, 1,2-dimethoxyethane, diethylene glycol dimethyl ether, triethylene glycol dimethyl ether, 1,4-dioxane, hexane, cyclohexane, heptane, benzene, toluene, xylene, methylene dichloride and ethylene dichloride can be used as the solvent. Among them, water, an alcohol solvent, and aliphatic and aromatic organic solvents such as acetone, methyl ethyl ketone, 1,2-dimethoxyethane, diethylene glycol dimethyl ether, triethylene glycol dimethyl ether, 1,4-dioxane, hexane, cyclohexane, heptane, benzene, toluene and xylene are preferable. Among them, a solvent whose boiling point at 1 atm is 115° C. or lower is favorable. Such a solvent can easily be separated from the generated oxymethylene copolymer and the collected trioxane by distillation. Alternatively, a monomer or a comonomer such as trioxane or 1,3-dioxolane may be used as a solvent. Alternatively, the polymerization terminator to be added may be diluted in a separately produced oxymethylene copolymer.

The amount of the polymerization terminator added is not particularly limited, but it is usually 0.1-100 equivalent, preferably 1-10 equivalent and most preferably 1-2 equivalent with respect to the amount of the acidic compound (A) used. If the amount of the polymerization terminator added is 100 equivalent or less, coloring and decrease in the molecular weight of the oxymethylene copolymer due to decomposition are unlikely to be caused. Moreover, if it is 0.1 equivalent or more, decrease in the molecular weight of the oxymethylene copolymer due to depolymerization is unlikely to be caused. Here, an equivalent of the polymerization terminator refers to the number of moles required for deactivating 1 mol of the acidic compound (A).

When an amine compound is used with a hydroxide or an alcoholate of an alkali metal or an alkaline earth metal in combination as the polymerization terminator, the amount of the amine compound used is preferably 0.1-100 equivalent, more preferably 1-50 equivalent and most preferably 1-10 equivalent with respect to the amount of the acidic compound (A) used. Meanwhile, the amount of the hydroxide or the alcoholate of an alkali metal or an alkaline earth metal used is preferably 0.001-50 equivalent, more preferably 0.01-5 equivalent, and most preferably 0.1-2 equivalent with respect to the amount of the acidic compound (A) used. By using 0.1 equivalent or more of an amine compound and a hydroxide or an alcoholate of an alkali metal or an alkaline earth metal in combination, the effect to terminate the polymerization would be sufficient even if the amount of the hydroxide or the alcoholate of an alkali metal or an alkaline earth metal used is reduced to 50 equivalent or less, and at the same time, coloring caused by excessive alkali metal component or alkaline earth metal component or decrease in the molecular weight of the oxymethylene copolymer can be suppressed which are caused when only a hydroxide or an alcoholate of an alkali metal or an alkaline earth metal is used.

<Conditions, Method and Device for Terminating Polymerization Reaction>

According to the present invention, termination of the polymerization reaction is carried out, while not particularly limited, under a pressurized condition of the internal vapor pressure or higher, which is preferably 0.15-50 MPa and more preferably 0.15-20 MPa. In addition, it is carried out at a temperature of preferably 130-300° C. and more preferably 135-250° C. The time for mixing the polymerization terminator added to deactivate the polymerization initiator is preferably 0.1-20 minutes and more preferably 1-10 minutes.

While the method for mixing the polymerization terminator is not particularly limited, in a batch case, the polymerization terminator is added to the above-described device used for the polymerization reaction after a predetermined period of time, and in a continuous case, the polymerization reaction product and the polymerization terminator are continuously supplied to the mixing device. In particular, a method that employs continuous mixing using a driver-free static-mixer-type reactor equipped with static-type stirring elements is preferable. The internal static-type stirring elements of the static-mixer-type reactor are not particularly limited, and various types such as those disclosed, for example, in Japanese Unexamined Patent Application Publication No. 2004-339271 and Japanese Patent No. 5502280 may be used. In particular, those configured with two types of elements with right and left twists made by twisting a rectangular plate at 180 degrees, or those configured with crossing plate lattice can favorably be used.

[IV. Heat Stabilization]

The oxymethylene copolymer after the termination of the polymerization (hereinafter, also referred to as a "polymerization mixture") usually contains 20-40 mass % of a residual monomer and volatile components such as formaldehyde and tetraoxane as decomposition products. The oxymethylene copolymer after the polymerization termination also usually contains 10 mass % or less of a thermally unstable moiety originating from the hemiacetal terminal that generates formaldehyde upon heating. In order to remove them, the method for producing an oxymethylene copolymer according to the present invention preferably further comprises a subsequent step of removing at least part of the volatile component and the thermally unstable moiety as gas component with a degassing apparatus (heat stabilization step).

Examples of such a degassing apparatus include a flash pot, a vented extruder provided with a single- or double-screw, a horizontal high viscosity liquid degassing apparatus provided with a specially shaped single- or double-screw stirring blade (for example, a spectacle-shape blade polymerizer from Hitachi Plant Technologies), a thin-film evaporator, a spray dryer and a strand degassing apparatus, where one or more selected from the group consisting of them are preferable. Among them, it is preferable to use a degassing apparatus selected from the group consisting of a flash pot, a vented extruder provided with a single- or double-screw, a horizontal high viscosity liquid degassing apparatus provided with a specially shaped single- or double-screw stirring blade, alone or in combination. In order to promote degassing of the above-described volatile component, a substance whose boiling point at atmospheric pressure is 200° C. or lower, e.g., water, may be forced into the degassing apparatus alone or together with a basic substance such as triethylamine and then depressurized for degassing. The volatile component (gas component) separated with the degassing apparatus may be liquified with a pressurization apparatus or a condensation apparatus, or absorbed with an absorption apparatus so that it can be, directly or after being purified by distillation or the like, recycled in the polymerization step.

According to the present invention, if the method for producing an oxymethylene copolymer further comprises the step of removing at least part of the volatile component and the thermally unstable moiety as gas component, the temperature for this step is, for example, but not particularly limited to, 130-300° C. and preferably 160-250° C. In addition, the pressure for this step is, for example, 0.00001-50 MPa and preferably 0.0001-5 MPa.

Thus, the method for producing an oxymethylene copolymer according to the present invention preferably further comprises the step of removing at least part of the volatile component and the thermally unstable moiety as gas component by placing the polymerization mixture obtained through polymerization reaction and termination of the polymerization reaction in a degassing apparatus of one or more selected from the group consisting of a flash pot, a vented extruder provided with a single- or double-screw, a horizontal high viscosity liquid degassing apparatus provided with a specially shaped single- or double-screw stirring blade at a temperature of 130-300° C. and a pressure of 0.00001-50 MPa. Preferably, the method further comprises the step of liquifying the removed gas component to recycle part or all of it in trioxane as the starting material.

Preferably, the above-described gas component removed at a temperature of 130-300° C. and a pressure of 0.00001-50 MPa is condensed for liquification with a heat exchanger, while the heat energy is recovered. The methods for condensing the gas component for liquification and recovering heat are not particularly limited, and may appropriately be selected from generally employed heat exchanging methods. For example, a surface condenser such as a double pipe heat exchanger, a vertically arranged shell and tube heat exchanger, a horizontally arranged shell and tube heat exchanger, a coiled plate-type (spiral) heat exchanger, a coiled tube-type (spiral) heat exchanger or a plate heat exchanger, or a direct contact condenser (direct condenser) such as packed columns, a spray condenser or tray columns may be used. Specifically, a direct contact condenser (direct condenser) such as packed columns, a spray condenser or tray columns may be used under a pressure condition of 0.1 MPa or more so as to condense gas for liquification and recover heat as described in German Patent No. 3231797A1. Moreover, a direct contact condenser (direct condenser) is preferably used to allow the gas component containing trioxane to make contact with liquid trioxane at a temperature lower than that of the gas component, preferably 65-150° C., so that it is cooled and liquified at 65-160° C. under a pressure higher than 0.1 MPa, preferably 0.11-2.0 MPa, and recycled as a starting material for polymerization.

The volatile component and the thermally unstable moiety that have been removed as the gas component by such methods can thereafter be pelletized, thereby obtaining an oxymethylene copolymer with good thermal stability and formability.

According to the method for producing an oxymethylene copolymer of the present invention, an antioxidant, a stabilizer such as a heat stabilizer may be added and mixed during the above-described step of removing the volatile component and the thermally unstable moiety or during a subsequent step, with an industrially general melt mixing device such as a single- or double-screw extruder, a horizontal high viscosity liquid degassing apparatus provided with a specially shaped single- or double-screw stirring blade, or a static mixer.

<Stabilizer>

Examples of the above-mentioned antioxidant, although not particularly limited to, include sterically hindered phenol compounds such as triethylene glycol-bis-3-(3-t-butyl-4-hydroxy-5-methyl phenyl)propionate, pentaerythrityl-tetrakis-3-(3,5-di-t-butyl-4-hydroxyphenyl)propionate, 2,2'-methylene bis(6-t-butyl-4-methyl phenol), 3,9-bis {2-[3-(3-t-butyl-4-hydroxy-5-methyl phenyl]propionyloxy)-1,1-dimethylethyl}-2,4,8,10-tetraoxaspiro[5,5]undecane, N,N'-hexane-1,6-diylbis[3-(3,5-di-t-butyl-4-hydroxyphenyl) propionamide] and 3,5-bis(1,1-dimethylethyl)-4-hydroxy benzenepropionic acid 1,6-hexanediylester, where one or more selected from the group consisting of them are preferable.

Examples of the heat stabilizer include, but not particularly limited to, triazine compounds such as melamine, methylol melamine, benzoguanamine, cyanoguanidine and N,N-diallyl melamine, organic compounds such as a polyamide compound, an urea derivative, an urethane compound, and inorganic acid salts, hydroxides, and organic acid salts of sodium, potassium, calcium, magnesium and barium. Among them, it is preferable to use one or more stabilizers selected from the group consisting of a sterically hindered phenol compound and a triazine compound, and, it is most preferable to use a combination of triethylene glycol-bis-3-(3-t-butyl-4-hydroxy-5-methyl phenyl)propionate and melamine.

Specifically, the method for producing an oxymethylene copolymer according to the present invention preferably further comprises a step of adding one or more stabilizers selected from the group consisting of a sterically hindered phenol compound and a triazine compound.

If a stabilizer is to be added to the polymerization mixture, the amount of the stabilizer added is not particularly limited and may appropriately be selected according to the purpose and the like. The amount of the stabilizer added is, for example, preferably 0.0001-10 mass % and more preferably 0.001-5 mass % with respect to the polymerization mixture.

The amount of the unstable moiety in the oxymethylene copolymer pellets as a final product obtained by the method for producing an oxymethylene copolymer according to the present invention, as measured in terms of, for example, weight loss upon heating at 240° C. under a reduced pressure of 10 torr for 2 hours is, although not particularly limited, preferably 1.5 mass % or less and more preferably 1.4-0.1 mass % such that the ratio thereof is small.

Thus, according to the production method of the present invention detailed above, the resulting oxymethylene copolymer has properties as superior as those of an oxymethylene copolymer obtained by a conventional method and can be used for the same purposes.

Additionally, if desired, an additive, for example, a colorant, a nucleating agent, a plasticizer, a mold release agent, a fluorescent brightening agent, an antistatic agent such as polyethylene glycol or glycerine, a photostabilizer such as a benzophenone-based compound or a hindered amine-based compound may be added to the oxymethylene copolymer produced by the production method of the present invention.

EXAMPLES

Hereinafter, the present invention will be described by way of Examples and Comparative examples, although the present invention should not be limited thereto.

Terms and measurement methods described in Examples and Comparative examples will be described hereinafter.

<Intrinsic Viscosity>

0.1 mass % of an oxymethylene copolymer obtained in Example or Comparative example was dissolved in a p-chlorophenol solution added with 2 mass % of alpha-pinene to measure the intrinsic viscosity with an Ostwald viscometer at a temperature of 60° C. A higher intrinsic viscosity indicates that a high molecular weight oxymethylene copolymer can be obtained, and that the method is excellent in producing a high molecular weight oxymethylene copolymer.

<Preparation of Polymerization Initiator Solution>

(1) Perchloric Acid Solution

Perchloric acid (70 mass % aqueous solution, reagent from Kanto Chemical Co., INC) was diluted in diethylene glycol dimethyl ether to prepare a perchloric acid-diethylene glycol dimethyl ether solution just before use.

(2) Trifluoromethane Sulfonic Acid Solution

Trifluoromethane sulfonic acid (reagent from Wako Pure Chemical Industries) was diluted in diethylene glycol dimethyl ether to prepare a trifluoromethane sulfonic acid-diethylene glycol dimethyl ether solution just before use.

<Preparation of Protonic Acid Salt>

(1) Perchloric Acid Salt Solution

Sodium methoxide (28 mass % methanol solution, reagent from Wako Pure Chemical Industries) was allowed to react with perchloric acid (70 mass % aqueous solution, reagent from Kanto Chemical Co., INC) at a molar ratio of 1:1 in diethylene glycol dimethyl ether at 25° C. to prepare a $NaClO_4$-diethylene glycol dimethyl ether solution just before use.

(2) Trifluoromethane Sulfonic Acid Salt Solution

Triethylamine (reagent from Wako Pure Chemical Industries) was allowed to react with trifluoromethane sulfonic acid (reagent from Wako Pure Chemical Industries) at a molar ratio of 1:1 in diethylene glycol dimethyl ether at 25° C. to prepare a trifluoromethane sulfonic acid triethylamine salt-diethylene glycol dimethyl ether solution just before use.

EXAMPLES AND COMPARATIVE EXAMPLES

Example 1

A SUS316 pressure-proof reactor having an internal volume of 500 mL and provided with a heater and an agitator was used as a polymerizer to produce an oxymethylene copolymer by batch polymerization.

The SUS316 pressure-proof reactor was washed with acid before use using a 1% aqueous sulfuric acid solution, then washed with pure water and acetone, and subjected to a high-temperature heat treatment in ambient atmosphere at 350° C. for 7 hours.

The reactor was heated to 80° C. and inside was dried and replaced with dry nitrogen. Then, as copolymer starting materials, 220 g (100 parts by mass) of trioxane containing 1.7 mass ppm of triethanolamine (a basic compound) (which contains 100 mass ppm of a sterically hindered phenol compound, hexamethylene bis[3-(3,5-di-t-butyl-4-hydroxyphenyl)propionate] as a stabilizer, where impurities such as water, formic acid and formaldehyde were each 20 mass ppm or less) and 11 g (5 parts by mass) of 1,3-dioxolane as a comonomer were loaded, to which 0.1 mL of a solution obtained by 100-fold diluting 1 mol/L sulfuric acid in diethylene glycol dimethyl ether was added and agitated at 150 rpm. Here, trioxane containing 1.7 mass ppm of triethanolamine means that 0.00103 mmol of triethanolamine is contained per 1 mol of trioxane. The amount of sulfuric acid added was 0.40 mol per 1 mol of triethanolamine contained in trioxane.

The reactor was pressurized to 2.5 MPaG with high pressure nitrogen and heated until the internal temperature became 150° C. while agitating at 150 rpm. Thereafter, perchloric acid ($HClO_4$) in an amount of 1.2 mass ppm with respect to trioxane in a form of a 3 mass % perchloric acid-diethylene glycol dimethyl ether solution as a polymerization initiator, and sodium perchlorate ($NaClO_4$) in an amount of 1.2 mass ppm with respect to trioxane in a form of a 0.5 mass % $NaClO_4$-diethylene glycol dimethyl ether solution as a protonic acid salt were prepared and mixed just before use. Together with 1 mL of benzene, the resultant was injected into the reactor using a pump to initiate reaction. The internal pressure increased to 3-4 MPaG by polymerization.

After two minutes of polymerization, tri-n-octylamine in an amount corresponding to 100 times the molar of the polymerization initiator was injected as a diethylene glycol dimethyl ether solution (solution concentration: 5 mmol/mL) together with 1 mL of benzene using a pump. Thereafter, the resultant was mixed at an agitator rotation speed of 50 rpm for 50 minutes to terminate the polymerization.

The pressure inside the reactor was discharged to evaporate the unreacted monomer and the decomposition product, thereby collecting the oxymethylene copolymer.

Although the internal temperature decreased by about 4° C. after the start of the polymerization, the internal temperature thereafter stayed between 146-152° C. Once the resulting oxymethylene copolymer was pulverized and low boiling point substances were removed under reduced pressure, the polymerization yield was 65 mass % and the intrinsic viscosity was 1.8 dl/g.

Example 2

The same procedure as Example 1 was performed except that an equimolar amount of 1 mol/L sulfurous acid was used instead of 1 mol/L sulfuric acid in Example 1. Although the internal temperature decreased by about 5° C. after the start of the polymerization, the internal temperature thereafter stayed between 145-152° C. Once the resulting oxymethylene copolymer was pulverized and low boiling point substances were removed under reduced pressure, the polymerization yield was 65 mass % and the intrinsic viscosity was 2.0 dl/g.

Example 3

A SUS316 pressure-proof reactor having an internal volume of 500 mL and provided with a heater and an agitator was used as a polymerizer to produce an oxymethylene copolymer by batch polymerization.

The SUS316 pressure-proof reactor was washed with acid before use using a 1% aqueous sulfuric acid solution, then washed with pure water and acetone, and subjected to a high-temperature heat treatment in ambient atmosphere at 350° C. for 7 hours.

The reactor was heated to 80° C. and inside was dried and replaced with dry nitrogen. Then, as copolymer starting materials, 220 g (100 parts by mass) of trioxane containing 1.7 mass ppm of triethanolamine (a basic compound) (which contains 100 mass ppm of a sterically hindered phenol compound, hexamethylene bis[3-(3,5-di-t-butyl-4-hydroxyphenyl)propionate] as a stabilizer, where impurities such as water, formic acid and formaldehyde were each 20 mass ppm or less) and 11 g (5 parts by mass) of 1,3-dioxolane as a comonomer were loaded, to which 0.07 mL of a solution obtained by 100-fold diluting 1 mol/L sulfuric acid in diethylene glycol dimethyl ether was added and agitated at 150 rpm. The amount of sulfuric acid added was 0.29 mol per 1 mol of triethanolamine contained in trioxane.

The reactor was pressurized to 2.5 MPaG with high pressure nitrogen and heated until the internal temperature became 150° C. while agitating at 150 rpm. Thereafter, perchloric acid ($HClO_4$) in an amount of 1.2 mass ppm with respect to trioxane in a form of a 3 mass % perchloric acid-diethylene glycol dimethyl ether solution as a polymerization initiator, and sodium perchlorate ($NaClO_4$) in an amount of 1.2 mass ppm with respect to trioxane in a form of a 0.5 mass % $NaClO_4$-diethylene glycol dimethyl ether solution as a protonic acid salt were prepared and mixed just before use. Together with 1 mL of benzene, the resultant was injected into the reactor using a pump to initiate reaction. The internal pressure increased to 3-4 MPaG by polymerization.

After two minutes of polymerization, tri-n-octylamine in an amount corresponding to 100 times the molar of the polymerization initiator was injected as a diethylene glycol dimethyl ether solution (solution concentration: 5 mmol/mL) together with 1 mL of benzene using a pump. Thereafter, the resultant was mixed at an agitator rotation speed of 50 rpm for 50 minutes to terminate the polymerization.

The pressure inside the reactor was discharged to evaporate the unreacted monomer and the decomposition product, thereby collecting the oxymethylene copolymer.

Although the internal temperature decreased by about 4° C. after the start of the polymerization, the internal temperature thereafter stayed between 146-152° C. Once the resulting oxymethylene copolymer was pulverized and low boiling point substances were removed under reduced pressure, the polymerization yield was 64 mass % and the intrinsic viscosity was 1.5 dl/g.

Example 4

The same procedure as Example 3 was performed except that an equimolar amount of 1 mol/L sulfurous acid was used instead of 1 mol/L sulfuric acid in Example 3. Although the internal temperature decreased by about 5° C. after the start of the polymerization, the internal temperature thereafter stayed between 145-152° C. Once the resulting oxymethylene copolymer was pulverized and low boiling point substances were removed under reduced pressure, the polymerization yield was 63 mass % and the intrinsic viscosity was 1.6 dl/g.

Comparative Example 1

The same procedure as Example 1 was performed except that 1 mol/L sulfuric acid was not added to copolymer starting materials, namely, trioxane containing 1.7 mass ppm of triethanolamine and 1,3-dioxolane as a comonomer in Example 1. An oxymethylene copolymer was not produced and the internal temperature did not change.

Comparative Example 2

The same procedure as Example 1 was performed except that 1 mol/L sulfuric acid was not added to copolymer starting materials, namely, trioxane containing 1.7 mass ppm of triethanolamine and 1,3-dioxolane as a comonomer in Example 1, and that perchloric acid ($HClO_4$) in an amount of 2.1 mass ppm with respect to trioxane in a form of a 3 mass % perchloric acid-diethylene glycol dimethyl ether solution as a polymerization initiator, and sodium perchlorate ($NaClO_4$) in an amount of 1.2 mass ppm with respect to trioxane in a form of a 0.5 mass % $NaClO_4$-diethylene glycol dimethyl ether solution as a protonic acid salt were added.

Although the internal temperature decreased by about 4° C. after the start of the polymerization, the internal temperature thereafter stayed between 146-152° C. Once the resulting oxymethylene copolymer was pulverized and low boiling point substances were removed under reduced pressure, the polymerization yield was 51 mass % and the intrinsic viscosity was 0.8 dl/g.

Comparative Example 3

The same procedure as Example 1 was performed except that, instead of perchloric acid ($HClO_4$) in Example 1, a solution obtained by 100-fold diluting 1 mol/L sulfuric acid was added as a polymerization initiator such that sulfuric acid was in an amount of 0.59 mass ppm with respect to trioxane in diethylene glycol dimethyl ether, and that a protonic acid salt was not added. An oxymethylene copolymer was not produced and the internal temperature did not change.

Comparative Example 4

A SUS316 pressure-proof reactor having an internal volume of 500 mL and provided with a heater and an agitator was used as a polymerizer to produce an oxymethylene copolymer by batch polymerization.

The SUS316 pressure-proof reactor was washed with acid before use using a 1% aqueous sulfuric acid solution, then washed with pure water and acetone, and subjected to a high-temperature heat treatment in ambient atmosphere at 350° C. for 7 hours.

The reactor was heated to 80° C. and inside was dried and replaced with dry nitrogen. Then, as copolymer starting materials, 220 g (100 parts by mass) of trioxane obtained after purifying trioxane containing 1.7 mass ppm of triethanolamine (a basic compound) by distillation to remove triethanolamine in advance (where the resultant contains 100 mass ppm of a sterically hindered phenol compound, hexamethylene bis[3-(3,5-di-t-butyl-4-hydroxyphenyl)propionate] as a stabilizer, where impurities such as water, formic acid and formaldehyde were each 20 mass ppm or less) and 11 g (5 parts by mass) of 1,3-dioxolane as a comonomer were loaded and agitated at 150 rpm. The reactor was pressurized to 2.5 MPaG with high pressure nitrogen and heated until the internal temperature became 150° C. while agitating at 150 rpm. Thereafter, perchloric acid ($HClO_4$) in an amount of 1.2 mass ppm with respect to trioxane in a form of a 3 mass % perchloric acid-diethylene glycol dimethyl ether solution as a polymerization initiator, and sodium perchlorate ($NaClO_4$) in an amount of 1.2 mass ppm with respect to trioxane in a form of a 0.5 mass % $NaClO_4$-diethylene glycol dimethyl ether solution as a protonic acid salt were prepared and mixed just before use. Together with 1 mL of benzene, the resultant was injected into the reactor using a pump to initiate reaction. The internal pressure increased to 3-4 MPaG by polymerization.

After two minutes of polymerization, tri-n-octylamine in an amount corresponding to 100 times the molar of the polymerization initiator was injected as a diethylene glycol dimethyl ether solution (solution concentration: 5 mmol/mL) together with 1 mL of benzene using a pump. Thereafter, the resultant was mixed at an agitator rotation speed of 50 rpm for 50 minutes to terminate the polymerization.

The pressure inside the reactor was discharged to evaporate the unreacted monomer and the decomposition product, thereby collecting the oxymethylene copolymer.

Although the internal temperature decreased by about 4° C. after the start of the polymerization, the internal temperature thereafter stayed between 146-152° C. Once the resulting oxymethylene copolymer was pulverized and low boiling point substances were removed under reduced pressure, the polymerization yield was 64 mass % and the intrinsic viscosity was 1.8 Ng.

However, in order to purify trioxane by distillation in advance, there were needs of heating energy and equipment for distillation for the distillation purification, which deteriorated economic efficiency as compared to methods of other examples.

Reference Example 1

220 g of trioxane (from Mitsubishi Gas Chemical, purity: 99.96%) containing 1.7 mass ppm of triethanolamine (a basic compound) and 11 g of 1,3-dioxolane (from Toho Chemical Industry, purity: 99.99%) as a comonomer were injected into a 1 L polymerization reactor provided with an agitator kept at 60° C. in a nitrogen atmosphere, then to which boron trifluoride diethyl etherate as a polymerization catalyst (acid catalyst) was added in an amount of 34 ppm with respect to trioxane to allow reaction for 15 minutes. N,N-diethyl hydroxylamine (from Arkema) as a deactivator was added in an amount of 4 times the molar of the polymerization catalyst. In doing so, the deactivator was diluted in benzene to a concentration of 0.1 mol/L before being added. Five minutes after the addition of the deactivator, the reactor was terminated to obtain a crude oxymethylene copolymer. As a result of pulverizing the resulting oxymethylene copolymer and removing low boiling point substances under reduced pressure, the polymerization yield was 92 mass % and the intrinsic viscosity was 1.87 dl/g.

Reference Example 2

220 g of trioxane (from Mitsubishi Gas Chemical, purity: 99.96%) containing 1.7 mass ppm of triethanolamine (a basic compound) and 11 g of 1,3-dioxolane (from Toho Chemical Industry, purity: 99.99%) as a comonomer were injected into a 1 L polymerization reactor provided with an agitator kept at 60° C. in a nitrogen atmosphere, to which 0.1 mL of a solution obtained by 100-fold diluting 1 mol/L sulfuric acid in diethylene glycol dimethyl ether was further added. Additionally, boron trifluoride diethyl etherate as a polymerization catalyst (acid catalyst) was added in an amount of 34 ppm with respect to trioxane to allow reaction for 15 minutes.

N,N-diethyl hydroxylamine (from Arkema) as a deactivator was added in an amount of 4 times the molar of the polymerization catalyst. In doing so, the deactivator was diluted in benzene to a concentration of 0.1 mol/L before being added. Five minutes after the addition of the deactivator, the reactor was terminated to obtain a crude oxymethylene copolymer. Once the resulting oxymethylene copolymer was pulverized and low boiling point substances were removed under reduced pressure, the polymerization yield was 92 mass % and the intrinsic viscosity was 1.85 dl/g.

Reference Example 3

220 g of trioxane (from Mitsubishi Gas Chemical, purity: 99.96%) containing 1.7 mass ppm of triethanolamine (a basic compound) and 11 g of 1,3-dioxolane (from Toho Chemical Industry, purity: 99.99%) as a comonomer were injected into a 1 L polymerization reactor provided with an agitator kept at 60° C. in a nitrogen atmosphere, then to which 0.38 mass ppm of perchloric acid (HClO$_4$) in a form of a 3 mass % perchloric acid-diethylene glycol dimethyl ether solution was added as a polymerization catalyst (acid catalyst) to allow reaction for 15 minutes.

N,N-diethyl hydroxylamine (from Arkema) as a deactivator was added in an amount of 600 times the molar of the polymerization catalyst used. In doing so, the deactivator was diluted in benzene to a concentration of 0.1 mol/L before being added. Five minutes after the addition of the deactivator, the reactor was terminated to obtain a crude oxymethylene copolymer. Once the resulting oxymethylene copolymer was pulverized and low boiling point substances were removed under reduced pressure, the polymerization yield was 84 mass % and the intrinsic viscosity was 2.1 dl/g.

Reference Example 4

220 g of trioxane (from Mitsubishi Gas Chemical, purity: 99.96%) containing 1.7 mass ppm of triethanolamine (a basic compound) and 11 g of 1,3-dioxolane (from Toho Chemical Industry, purity: 99.99%) as a comonomer were injected into a 1 L polymerization reactor provided with an agitator kept at 60° C. in a nitrogen atmosphere, to which 0.1 mL of a solution obtained by 100-fold diluting 1 mol/L sulfuric acid in diethylene glycol dimethyl ether was further added. Additionally, 0.38 mass ppm of perchloric acid (HClO$_4$) in a form of a 3 mass % perchloric acid-diethylene glycol dimethyl ether solution was added as a polymerization catalyst (acid catalyst) to allow reaction for 15 minutes.

N,N-diethyl hydroxylamine (from Arkema) as a deactivator was added in an amount of 600 times the molar of the polymerization catalyst used. In doing so, the deactivator was diluted in benzene to a concentration of 0.1 mol/L before being added. Five minutes after the addition of the deactivator, the reactor was terminated to obtain a crude oxymethylene copolymer. Once the resulting oxymethylene copolymer was pulverized and low boiling point substances were removed under reduced pressure, the polymerization yield was 89 mass % and the intrinsic viscosity was 1.7 dl/g.

The results from Examples, Comparative examples and Reference examples above are summarized in Tables 1 and 2 below.

TABLE 1

| | Copolymer starting materials | | | | | | |
|---|---|---|---|---|---|---|---|
| | TOX | DOL | Basic compound (B) | | Acidic compound (C) | | |
| | Parts by mass | Parts by mass | Type | Amount added[2] mass ppm | Type | Amount added ml | Amount added mol/mol-TEA |
| Example 1 | 100 | 5 | TEA | 1.7 | Sulfuric acid | 0.1 | 0.40 |
| Example 2 | 100 | 5 | TEA | 1.7 | Sulfurous acid | 0.1 | 0.40 |
| Example 3 | 100 | 5 | TEA | 1.7 | Sulfuric acid | 0.07 | 0.29 |
| Example 4 | 100 | 5 | TEA | 1.7 | Sulfurous acid | 0.07 | 0.29 |
| Comparative example 1 | 100 | 5 | TEA | 1.7 | — | — | — |
| Comparative example 2 | 100 | 5 | TEA | 1.7 | — | — | — |
| Comparative example 3 | 100 | 5 | TEA | 1.7 | Sulfuric acid | 0.1 | 0.40 |
| Comparative example 4[1] | 100 | 5 | TEA | 1.7 | — | — | — |
| Reference example 1 | 100 | 5 | TEA | 1.7 | — | — | — |
| Reference example 2 | 100 | 5 | TEA | 1.7 | Sulfuric acid | 0.1 | 0.40 |
| Reference example 3 | 100 | 5 | TEA | 1.7 | — | — | — |
| Reference example 4 | 100 | 5 | TEA | 1.7 | Sulfuric acid | 0.1 | 0.40 |

| | Polymerization initiator | | Salt of protonic acid Amount of HClO$_4$ added[2] mass ppm | Polymerization method |
|---|---|---|---|---|
| | Type | Amount added[2] mass ppm | | |
| Example 1 | HClO$_4$ | 1.2 | 1.2 | Melt polymerization |
| Example 2 | HClO$_4$ | 1.2 | 1.2 | Melt polymerization |
| Example 3 | HClO$_4$ | 1.2 | 1.2 | Melt polymerization |
| Example 4 | HClO$_4$ | 1.2 | 1.2 | Melt polymerization |
| Comparative example 1 | HClO$_4$ | 1.2 | 1.2 | Melt polymerization |
| Comparative example 2 | HClO$_4$ | 1.2 | 1.2 | Melt polymerization |

TABLE 1-continued

| | | | | |
|---|---|---|---|---|
| Comparative example 3 | Sulfuric acid | 0.59 | — | Melt polymerization |
| Comparative example 4[1)] | HClO$_4$ | 1.2 | 1.2 | Melt polymerization |
| Reference example 1 | BF$_3$ complex | 34 | — | Bulk polymerization |
| Reference example 2 | BF$_3$ complex | 34 | — | Bulk polymerization |
| Reference example 3 | HClO$_4$ | 0.38 | — | bulk polymerization |
| Reference example 4 | HClO$_4$ | 0.38 | — | bulk polymerization |

TOX: Trioxane,
DOL: 1,3-Dioxolane,
TEA: Triethanolamine,
BF$_3$ complex: Boron trifluoride diethyl etherate
[1)]Triethanolamine was removed by distillation in advance
[2)]Amount added with respect to trioxane

TABLE 2

| | Polymerization yield (mass %) | Intrinsic viscosity (dl/g) | Economic efficiency |
|---|---|---|---|
| Example 1 | 65 | 1.8 | Excellent |
| Example 2 | 65 | 2.0 | Excellent |
| Example 3 | 64 | 1.5 | Excellent |
| Example 4 | 63 | 1.6 | Excellent |
| Comparative example 1 | No copolymer produced | — | — |
| Comparative example 2 | 51 | 0.8 | Unacceptable |
| Comparative example 3 | No copolymer produced | — | — |
| Comparative example 4 | 64 | 1.8 | Unacceptable |
| Reference example 1 | 92 | 1.87 | Acceptable |
| Reference example 2 | 92 | 1.85 | Acceptable |
| Reference example 3 | 84 | 2.1 | Acceptable |
| Reference example 4 | 89 | 1.7 | Acceptable |

As described above, in Examples 1-4 where polymerization reaction was carried out by: using copolymer starting materials containing triethanolamine as a basic compound (B); adding sulfuric acid and sulfurous acid as an acidic compound (C) to the copolymer starting materials prior to the polymerization reaction; and using perchloric acid as an acidic compound (A), both of the molecular weight and the yield of the resulting oxymethylene copolymer were excellent, and the methods were superior in terms of economic efficiency over Comparative example 4. On the other hand, an oxymethylene copolymer was not produced in Comparative example 1 which did not use an acidic compound (C). In Comparative example 2 where an excess amount of perchloric acid was used, an oxymethylene copolymer was produced but the molecular weight and the yield were poor. In Comparative example 3 where both of the acidic compound (A) and the acidic compound (C) were sulfuric acid/sulfurous acid, an oxymethylene copolymer was not produced. Meanwhile, in Comparative example 4, both of the molecular weight and the yield of the resulting oxymethylene copolymer were equivalent to those of Examples 1-4 but economic efficiency was poor since triethanolamine had to be removed in advance by distillation. In Reference examples 1-4, although the molecular weight and the yield of the oxymethylene copolymer were both good, there was no change or intrinsic viscosity even worsened upon addition of the acidic compound (C). Specifically, Reference examples 1-4 did not give an advantageous effect resulting from the acidic compound (C) as in Examples. Moreover, since the oxymethylene copolymers were produced by bulk polymerization in Reference examples 1-4, they were inferior in economic efficiency as compared to Examples 1-4 that employ melt polymerization.

Accordingly, a method for producing an oxymethylene copolymer, the method comprising subjecting copolymer starting materials including trioxane and a comonomer to polymerization reaction in the presence of a polymerization initiator containing an acidic compound (A), wherein the copolymer starting materials contain a basic compound (B); an acidic compound (C) different from the acidic compound (A) is added to the copolymer starting materials prior to the polymerization reaction to allow reaction between the basic compound (B) and the acidic compound (C) in advance; and the polymerization reaction is carried out through melt polymerization, is found to be superior in terms of the molecular weight, the yield and the economic efficiency of the resulting oxymethylene copolymer over conventionally known methods in which the basic compound (B) is removed from the starting material trioxane through a procedure such as distillation, or in which an excess amount of a polymerization initiator is used to cancel the inhibition action of the basic compound (B) upon polymerization reaction.

The invention claimed is:

1. A method for producing an oxymethylene copolymer, the method comprising subjecting a copolymer starting material comprising trioxane and a comonomer to polymerization reaction in the presence of a polymerization initiator comprising an acidic compound (A), wherein
    the copolymer starting material comprises a basic compound (B);
    an acidic compound (C) different from the acidic compound (A) is added to the copolymer starting material prior to the polymerization reaction to allow reaction between the basic compound (B) and the acidic compound (C) in advance, wherein the acidic compound (C) is sulfurous acid; and
    the polymerization reaction is carried out through melt polymerization.

2. The method for producing an oxymethylene copolymer according to claim 1, wherein the basic compound (B) is added as a stabilizer to trioxane and/or the comonomer.

3. The method for producing an oxymethylene copolymer according to claim 1, wherein the basic compound (B) is an amine compound.

4. The method for producing an oxymethylene copolymer according to claim 1, wherein the basic compound (B) is triethanolamine.

5. The method for producing an oxymethylene copolymer according to claim 1, wherein the content of the basic compound (B) in the copolymer starting material is 0.00001 mmol or more and 0.1 mmol or less per 1 mol of trioxane comprised in the copolymer starting material.

6. The method for producing an oxymethylene copolymer according to claim 1, wherein the amount of the acidic compound (C) added is 0.01 mol or more and 2.0 mol or less per 1 mol of the basic compound (B) comprised in the copolymer starting material.

7. The method for producing an oxymethylene copolymer according to claim 1, wherein the acidic compound (A) is one or more selected from the group consisting of protonic acids, protonic acid anhydrides and protonic acid esters.

8. The method for producing an oxymethylene copolymer according to claim 1, wherein the acidic compound (A) is one or more selected from the group consisting of perchloric acid, perfluoroalkyl sulfonic acid, acid anhydrides thereof and esters thereof.

9. The method for producing an oxymethylene copolymer according to claim 1, wherein the amount of the acidic compound (A) used for the polymerization reaction is 0.001 mass ppm or more and 10 mass % or less with respect to trioxane.

10. The method for producing an oxymethylene copolymer according to claim 1, wherein the polymerization reaction is carried out further in the presence of at least one protonic acid salt.

11. The method for producing an oxymethylene copolymer according to claim 10, wherein the protonic acid salt is a salt made from protonic acid and one or more alkaline components selected from the group consisting of alkali metals, alkaline earth metals, compounds comprising the same, ammonia and amine.

12. The method for producing an oxymethylene copolymer according to claim 10, wherein the amount of the protonic acid salt used for the polymerization reaction is 0.001 mass ppm or more and 10 mass % or less with respect to trioxane.

13. The method for producing an oxymethylene copolymer according to claim 10, wherein the molar ratio of the acidic compound (A) and the protonic acid salt is in a range of acidic compound (A): protonic acid salt=1:0.01-1:2000.

14. The method for producing an oxymethylene copolymer according to claim 1, wherein the polymerization reaction is carried further in the presence of ketone.

15. The method for producing an oxymethylene copolymer according to claim 1, wherein the polymerization reaction is carried out at a temperature of 135° C. or more and 300° C. or less.

16. The method for producing an oxymethylene copolymer according to claim 1, wherein stainless steel used in a device for producing trioxane and the comonomer used for the polymerization reaction and in a device for producing the oxymethylene copolymer is subjected, in advance, to one or more surface treatments selected from the group consisting of passivation treatment by washing with acid, high-temperature heat treatment, surface polishing and electrolytic polishing.

* * * * *